July 27, 1937.　　　　　H. DIAMOND　　　　　2,088,466
LIGHT SENSITIVE SYSTEM
Filed June 16, 1930
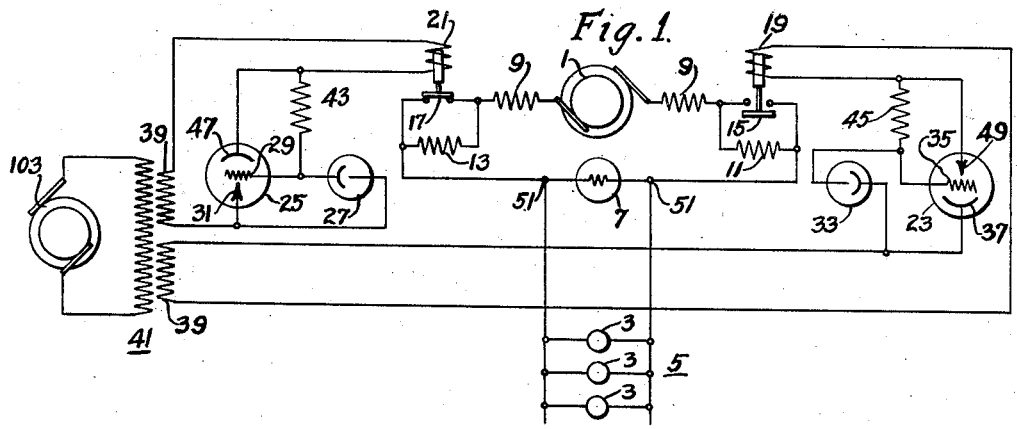
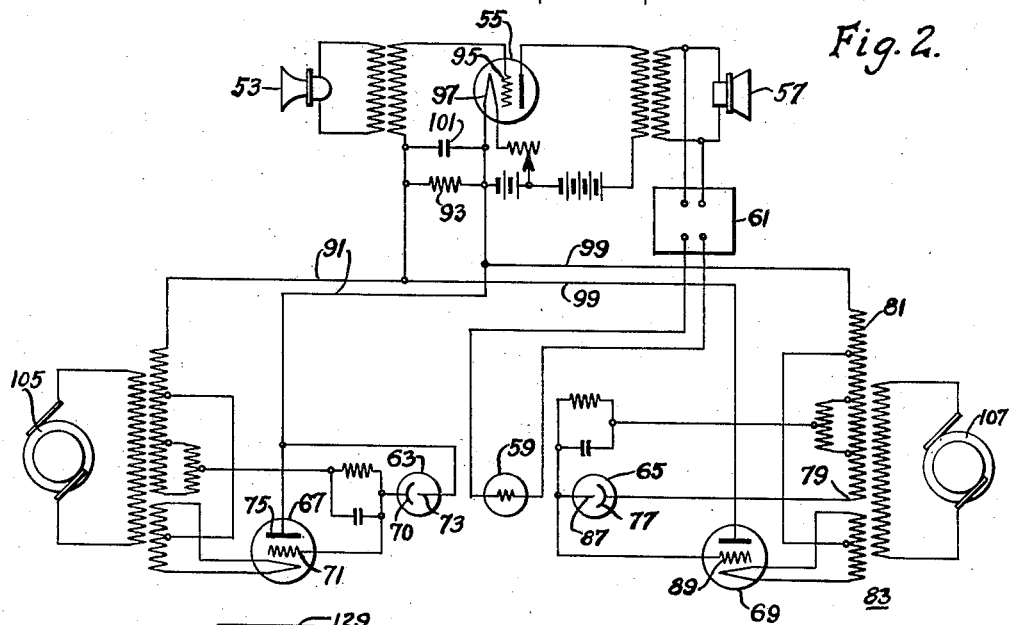
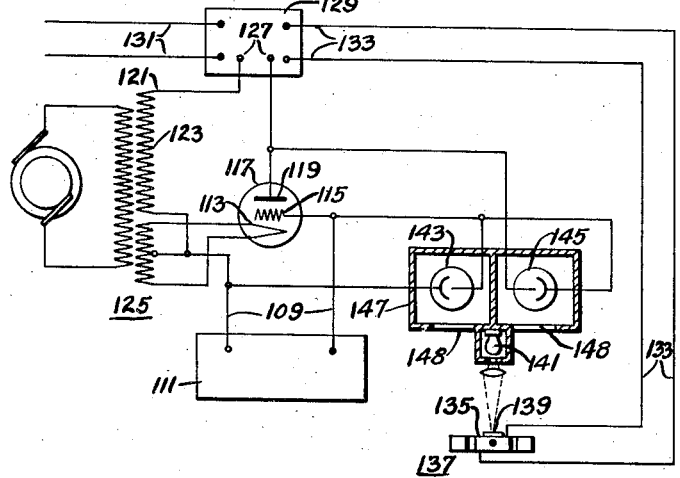
INVENTOR
*Hymen Diamond*
BY
ATTORNEY Patented July 27, 1937

2,088,466

UNITED STATES PATENT OFFICE 2,088,466

LIGHT SENSITIVE SYSTEM

Hymen Diamond, Pittsburgh, Pa., assignor to Westinghouse Electric & Manufacturing Company, a corporation of Pennsylvania Application June 16, 1930, Serial No. 461,511

15 Claims. (Cl. 171—229)

My invention relates to photo-sensitive devices and has particular relation to photo-sensitive compensating apparatus.

Compensating apparatus of the nature discussed herein may be utilized for equalizing a plurality of conditions of an electrical system. In particular, it may be used to compensate for variations in the voltage, current or power output of the system. It may also be applied to compensate for phase variations in the output of a system. In describing my invention and its applications, I shall hereinafter refer to the "output" of an electrical system, meaning thereby any one or any number of the physical characteristics of the output to which a particular application of my invention may relate.

It is an object of my invention to provide compensating apparatus, for a power-supply system, that shall be responsive both to an increase and to a decrease in the output of the system.

A further object of my invention is to provide apparatus, for compensating a power-supply system, that shall cause the output of the system to increase if it is smaller than a predetermined value and to decrease if it is greater than the predetermined value.

An additional object of my invention is to provide apparatus for compensating for variations in a power-supply system that shall cause an increase in the output of the system when it falls below a predetermined lower limit and that shall cause a decrease in the output if it rises above a predetermined upper limit.

A more specific object of my invention is to provide apparatus for compensating for variations in the power output of an amplifier that shall be responsive to bi-polar variations, about a predetermined value, of the output of the amplifier.

An additional specific object of my invention is to provide apparatus that shall respond to a beam of light, modified by an electrical system, to vary a predetermined characteristic of the system.

A further specific object of my invention is to provide apparatus that shall respond to a beam of light, capable of being deflected through a predetermined angle by a current supplied from an electrical system, to vary the condition of the system.

More concisely stated, it is an object of my invention to provide photo-sensitive apparatus, for compensating for variations in the output of an electrical system, of a type having a bi-polar response to bi-polar variations in the output of the system.

According to my invention, I provide compensating apparatus for an electrical system of a type wherein a plurality of photo-sensitive cells, under the influence of a source of light modified by the system, are so connected to the electrodes of a plurality of electric-discharge devices that a variation of either negative or positive polarity about a predetermined value, of the output of the system, causes the electric-discharge devices to respond, by producing a corresponding counteracting effect on the system.

In one embodiment of my invention, the electric current through the discharge devices traverses the exciting coils of a plurality of contactors that are adapted to add impedance or to remove impedance, depending upon the condition of the system.

In a modification of my invention, the voltage output of the electric-discharge devices is impressed between the grid and the cathode of an amplifying tube in such manner as to vary the output of the tube in a predetermined direction, in respose to a variation in the radiant energy emitted by a source, excited from the output of the amplifying tube.

The novel features that I consider characteristic of my invention are set forth with particularity in the appended claims. The invention itself, however, both as to its organization and its method of operation, together with additional objects and advantages thereof, will best be understood from the following description of specific embodiments, when read in connection with the accompanying drawing, in which:

Figure 1 is a schematic view showing a preferred embodiment of my invention,

Fig. 2 is a schematic view showing a modification of my invention, and

Fig. 3 is a schematic view showing another modification of my invention.

In Fig. 1, apparatus, of a type constructed and arranged according to my invention, is shown as applied to compensate for variations in the voltage drop across a bank of lamps. It is apparent that the apparatus illusrated in this view may be specifically applied in a situation where it is desirable to maintain an illuminating system constant. However, the lamp bank is added only to illustrate the utility of my invention and should be regarded only as symbolical and not as a restriction thereon.

The apparatus illustrated in the view comprises a generator 1 that supplies power for the excitation of the lamps 3, in the lamp bank 5, and for the excitation of a pilot lamp 7 that may (but need not necessarily) be a glow lamp, as is shown in the drawing. The current from the generator 1 traverses a plurality of impedances 9, 11 and 13, predetermined sections 11 and 13 of which are adapted to be shunted by a plurality of contactors 15 and 17. The exciting coils 19 and 21 of the contactors 15 and 17, respectively, are connected in the principal circuits of a plurality of electric-discharge devices 23 and 25, connected as will now be described.

A photo-cell 27, under the influence of the light from the pilot lamp 7, is connected between the control electrode 29 and the anode 31 of one tube 25, while a second cell 33, also under the influence of the light from the pilot lamp 7, is connected between the control electrode 35 and the cathode 37 of the remaining tube 23. The tubes are operated from the secondary 39 of a power-transmission transformer 41 and have the necessary impedances 43 and 45 connected between their remaining electrodes 47 and 49 and their grids 29 and 35, as has been taught by the prior art.

As the intensity of the illumination emitted by the pilot lamp 7 increases, the impedance of the cells 27 and 33 decrease. The variation of one polarity in the cell impedances effects a variation of the same polarity in the potential drop between the grid 35 and the cathode 37 of one tube 23 and a variation of opposite polarity in the potential drop between the grid 29 and the cathode 47 of the remaining tube 25. When the potential drop between the control electrode and the principal electrodes of tubes 23 and 25, of the type shown in the drawing, attains a predetermined value, the electrical condition of the tubes changes abruptly, and the current through the exciting coil of the relays is varied accordingly.

For an increase in the intensity of illumination of the pilot lamp 7 above a predetermined value, the tube 25, in the circuit of which the photo-electric cell 27 is connected between the grid 29 and the anode 31, breaks down, and the corresponding contactor 17 is raised, causing the impedance 13 to be added to the series impedance 9 of the generator 1. On the other hand, if the pilot-lamp-illumination intensity falls below a predetermined value, the tube 23, in the circuit of which the photo-electric cell 33 is connected, between the grid 35 and the cathode 37, breaks down and causes the contactor 15 associated therewith to close to short-circuit the corresponding impedance 11.

It is seen that, in this manner, the output across the terminals 51, between which the pilot lamp 7 and the illuminating lamps 3 are connected, may be held between predetermined limits. In particular, the voltage drop across a lamp bank, such as is shown in the drawing, may be maintained between predetermined limits.

It is to be noted that, although grid-controlled glow-tubes are specifically shown in the drawing of the above described embodiment of my invention, any type of tube, such as a mercury discharge tube, or a hot-cathode gaseous discharge tube, or an ordinary thermionic tube, is applicable. I have, however, found that a system of a type wherein grid-controlled glow-tubes are used has considerably more sensitivity than systems wherein tubes of other types are used. Furthermore, by reason of the fact that the grid-glow tubes may be connected in such manner as to take current only when operating the contactors, as is illustrated in Fig. 1, the operating cost and the maintenance cost of a system of this type are comparatively small.

It is well to point out that, by selecting a contactor of a type different than is shown in Fig. 1 and by changing the form of the circuit, in a well-known manner, the system may be made responsive to another condition of the tubes than is specified hereinabove. An example of such a modification is a system wherein the contactors are motivated when the discharge in the tubes is interrupted.

Finally, I may add that, by the word "impedance", I mean to designate an inductance, resistance or capacity of any type that it may be found desirable to utilize in the compensating system. I am well aware that my invention may be applied in a situation wherein it is necessary to shift the phase of an alternating voltage or an alternating current rather than to change its actual magnitude.

In Fig. 2 of the drawing, my invention is shown as applied to the continuous compensation for variations in the output volume of sound-translating apparatus. Here again, the apparatus to which my invention is applied is to be regarded only as symbolical. The actual essence of the modification resides in the fact that the compensation here is of a continuous nature.

The apparatus shown in the view comprises a sound-input device 53, such as a microphone, the output power of which is amplified by a triode 55. The amplified power from the tube 55 is impressed directly upon a loud speaker 57 and on a pilot lamp 59 (which here again may be a glow tube), through an electrical averaging device 61, such as a ballast lamp system, for example. It is, of course, understood that the current exciting the pilot lamp 59 may be amplified in any manner found necessary or advantageous.

The light from the pilot lamp 59 influences a plurality of photo-cells 63 and 65 connected to a plurality of amplifying tubes 67 and 69, in a manner described in a copending application to Edwin H. Vedder, Serial No. 433,492, filed March 5, 1930, and assigned to Westinghouse Electric and Manufacturing Company.

As specified in this application, the cathode 70 of one cell 63 is connected to the grid 71 of one tube 67, while its anode 73 is connected to the anode 75 thereof. The cathode 77 of the remaining cell 65 is connected to one terminal 79 of the secondary 81 of the transformer 83 through which power is supplied to a second tube 69, while the anode 87 of the cell 65 is connected directly to the grid 89 of the tube 69.

As the intensity of illumination emitted by the glow-tube 59 increases, the plate current of the tube 67, wherein one cell 63 is connected between the grid 71 and the anode 75 increases. A decrease in the illumination emitted by the pilot lamp 59 results in an increase in the plate current of the tube 69, to the grid 89 of which the remaining cell 65 is connected.

The output leads 91 of the circuit, wherein an increase in the intensity of illumination of the pilot lamp 59 results in an increase in the plate current of a tube 67, are connected across a resistor 93, which is, in turn, connected in series with the grid 95 and the cathode 97 of the amplifying tube 55 of the translating system. The polarity of the leads 91 is so regulated, relative to the polarity of the amplifier, that an increase in the plate current of the tube 67 results in a decrease in the potential between the cathode 97 and the grid 95 of the amplifying tube 55.

The output leads 99 of the circuit of the remaining tube 69 are connected across the resistor 93 that is in the grid circuit of the amplifying tube 55 in such a manner that an increase in the plate current of the tube 69 results in a corresponding increase of the potential of the grid 95 of the amplifying tube 55 relative to the cathode 97 thereof. A condenser 101 is connected across the resistor 93 in the grid circuit of the amplifying tube 55 to prevent sudden changes in the intensity of the pilot lamp 59 from markedly influencing the characteristic of the sound emitted from the loud speaker 57.

It is apparent that my invention may be applied to compensate for variations in other sound devices than the system shown. In particular, it may be utilized to provide compensation of the amplifying systems used in recording or in reproducing sound synchronized with motion pictures. In this connection, it may be applied to automatically control the volume of the sound output of such a system.

In Fig. 1, separate generators 1 and 103 are shown as the power-supply sources for the compensating system and for the compensated system, while, in Fig. 2, two generators 105 and 107 are shown as supplying power for the compensating circuit, while the compensated system is battery operated. The reduction of the circuits in either view to adapt them to operation from a single power-supply source is apparent and lies within the scope of my invention.

My invention may also be extended to the compensation of a system wherein more than one amplifying tube is utilized. Since the extension of my invention to apply to such a system is apparent, I shall not describe it herein in detail.

In apparatus of the type shown in Figs. 1 and 2, my invention is applied in combination with a light valve of a type that responds to variations in its exciting source by a variation in the intensity of the illumination that it emits. In apparatus of the type shown in Fig. 3, the compensation is accomplished through a light valve comprising a beam of light that is deflected in accordance with the condition of the output of the system which is being compensated.

The output leads 109 of a system 111 are connected between the cathode 113 and the grid 115 of a tube 117. The anode 119 of the tube 117 and one terminal 121 of the secondary 123 of the transformer 125, whereby power is supplied to the tube 117, are connected to the input terminals 127 of a system 129 that is symbolical of any type of apparatus that is being used in the particular situation wherein my invention is applied. One set of output leads 131 from the system 129 are connected to apparatus that it is necessary to use under the circumstances, while two other terminals 133 thereof are connected to the movable element 135 of a galvanometer 137.

A mirror 139 is mounted on the movable element 135 of the galvanometer 137 and is capable of deflecting a beam of light from a lamp 141 disposed adjacent thereto. The beam of light is thus adapted, under certain circumstances, to influence a plurality of cells 143 and 145 that are disposed within a light-tight container 147, equipped with windows 148, and are connected, respectively, between the grid 115 and the cathode 113 and the grid 115 and the anode 119 of the tube 117.

The movable element 135 of the galvanometer 137 is so connected to the output leads 133 of the electrical system 129 that an increase in the output of the system 129 results in the deflection of the beam of light in one direction, while a decrease in the output of the system results in the deflection of the beam in the opposite direction. As illustrated in Fig. 3, an increase in the output of the system 129 causes a deflection of the light beam to the left, while a decrease in the output causes a deflection of the light beam to the right.

The light beam deflected by an increase in the output of the system 129 impinges on the photocell 143 that is connected between the control electrode 115 and the cathode 113 of the thermionic tube 117. The light beam deflected in the opposite direction impinges on the photo-sensitive cell 145 that is connected between the control electrode 115 and the anode 119 of the tube 117. It is seen that an increase in the state of excitation of the cell 143, connected between the cathode 113 and the grid 115, causes a decrease in the potential of the grid 115 relative to the cathode 113, while an increase in the state of excitation of the remaining cell 145 causes an increase in the potential of the grid 115 relative to the cathode 113. The amplification factor of the tube 117 is thus regulated in accordance with the condition of the output of the electrical system 129 and, in turn, regulates the output of this system.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. Compensating apparatus for a system comprising a plurality of electric discharge devices each device having a control electrode and a plurality of principal electrodes, a plurality of impedances, the magnitude of which may be varied, means for so coupling one of said impedances between the control electrode and a principal electrode of one of said electric discharge devices that an increase in the magnitude of said impedances causes an increase in the magnitude of the output of said electric discharge device, means for so coupling another of said impedances between the control electrode and a principal electrode of another of said electric discharge devices that an increase in the magnitude of said impedance causes a decrease in the magnitude of the output of said electric discharge device, means responsive to the condition of said system for varying said impedances and means to be actuated by the outputs of said electric discharge devices when their outputs are varied by the variation of said impedances to maintain said system in substantially uniform condition.

2. Compensating apparatus for a system comprising a plurality of electric discharge devices, each device having an anode, a cathode and a control electrode, a plurality of impedances, the magnitude of which may be varied, means for coupling one of said impedances between the control electrode and anode of one of said electric discharge devices thereby to increase the output of said electric discharge device as the magnitude of said impedance is decreased, means for coupling another of said impedances between the control electrode and the cathode of another of said electric discharge devices thereby to decrease the output of said last-named electric discharge device as the magnitude of said impedance is decreased, means responsive to the condition of said system for varying said impedances and means to be actuated by the outputs of said electric discharge devices when their outputs are varied by the variation of said impedances to maintain said system in substantially uniform condition.

3. In translating apparatus an amplifying system and means for compensating for variations in the output of said system, said means comprising a plurality of photo-sensitive devices, means responsive to the output of said system for energizing said photo-sensitive devices, a plurality of electric discharge devices having input and output circuits, means for so coupling one of said photo-sensitive devices in the input circuit of one of said electric discharge devices that an increase in the output of said photo-sensitive device, produced by an increase in the output of said energizing means, produces an increase in the output of said electric discharge device, means for so coupling another of said photo-sensitive devices in the input circuit of another of said electric discharge devices that an increase in the output of said photo-sensitive device, produced by an increase in the output of said energizing means, produces a decrease in the output of said electric discharge device and means to be actuated by the outputs of said electric discharge devices when their outputs are varied to maintain the output of said system at a predetermined level.

4. In combination, a generator, a regulator therefor, and means comprising a lamp operatively connected to the generator and a photo-electric cell arranged to receive energy from said lamp for varying the effects of the regulator.

5. In apparatus of the character described, the combination with a generator, of a regulator comprising means for radiating light energy at an intensity which varies as the result of changes in the voltage generated, and means including a device having a light-sensitive electrode responsive to the intensity of the light energy radiated for varying the output of the generator.

6. In apparatus of the character described, the combination with a generator, of a regulator comprising a lamp for emitting radiant energy at a variable rate which is dependent upon the voltage of the generator, and means including a photo-electric cell for varying the output of the generator in response to changes in the emission of energy by said lamp.

7. In apparatus of the character described, the combination with a generator, of a regulator comprising a lamp lighted by said generator whereby fluctuations in the voltage generated produce corresponding fluctuations in the intensity of the light emitted by said lamp, and means including a photo-electric cell for varying the output of the generator in response to variation in the intensity of the light emitted by said lamp.

8. The combination with a generator, of a resistance adapted to be connected to said generator, and regulating means for short-circuiting said resistance comprising movable contact means, a lamp responsive to the voltage generated, an electromagnet for actuating said contact means, and means including a photo-electric cell arranged to receive light from said lamp for controlling the supply of energizing current to said electro-magnet.

9. The combination with a variable output generator having a field circuit of a regulator for varying the output including movable contact means, an electromagnet for actuating said movable contact means, a lamp arranged to receive energy from said generator whereby fluctuations in the voltage generated produce corresponding fluctuations in the intensity of the light emitted by said lamp, thermionic valve means for varying the ampere turns of said electromagnet, and a photoelectric cell positioned to receive light from said lamp for controlling said thermionic valve means.

10. The combination with a variable output generator, of a resistance adapted to be connected to said generator, and regulating means for short-circuiting said resistance comprising movable contact means, an electromagnet for actuating said movable contact means, a lamp arranged to receive energy from said generator whereby fluctuations in the voltage generated produce corresponding fluctuations in the intensity of the light emitted by said lamp, thermionic valve means for varying the ampere turns of said electromagnet, and a photo-electric cell positioned to receive light from said lamp for controlling said thermionic valve means.

11. The combination with a variable output generator, of a regulator for varying the output including movable contact means, an electromagnet for actuating said movable contact means, a lamp arranged to receive energy from said generator whereby fluctuations in the voltage generated produce corresponding fluctuations in the intensity of the light emitted by said lamp, thermionic valve means, and a photo-electric cell having a light-sensitive electrode connected to the grid element of said valve means whereby changes in the state of charge of said electrode produced by changes in the intensity of the light emitted by said lamp vary the ampere turns of said electromagnet.

12. The combination with a generator, of light emitting means arranged to receive energy from said generator so that the intensity of light emitted varies substantially proportionately with the output of the generator, a photo-electric cell, and means for varying the output of the generator including thermionic valve means for amplifying the effect produced upon said photo-electric cell by the changes in light intensity.

13. In combination, a generator, a regulator therefor and means comprising a source of radiant energy operatively connected to the generator, a first photo-electric cell arranged to receive energy from said source for varying the effects of said regulator in one sense when the output of said generator varies in one sense and a second photo-electric cell arranged to receive energy from said source for varying the effects of said regulator in the opposite sense when the output of said generator varies in the opposite sense.

14. In combination, a generator, a regulator therefor, and means comprising a source of radiant energy operatively connected to the generator and a photo-electric cell arranged to receive energy from said source of radiant energy for varying the effects of the regulator.

15. In combination, a generator, a regulator therefor and means comprising a first electric discharge device having an anode, a cathode and a control electrode, a first impedance arranged to vary in magnitude in response to variations in the output of said generator, means for coupling said first impedance between the control electrode and anode of said first discharge device whereby a decrease in the magnitude of said impedance produces an increase in the output of said discharge device, a second electric discharge device having an anode, a cathode and a control electrode, a second impedance arranged to vary in magnitude in response to variations in the output of said generator, means for coupling said second impedance between the control electrode and the cathode of said discharge device whereby a decrease in the magnitude of said impedance produces a decrease in the output of said discharge device and means for operatively connecting said discharge devices to said regulator.

HYMEN DIAMOND.